(12) United States Patent
Fernando et al.

(10) Patent No.: US 8,704,838 B2
(45) Date of Patent: Apr. 22, 2014

(54) LOAD BALANCING IN MULTIPLE PROCESSOR RENDERING SYSTEMS

(75) Inventors: Chandaka Fernando, Quakers Hill (AU); Anthony David Moriarty, Lane Cove (AU)

(73) Assignee: Canon Kabushiki Kaisha, Tokyo (JP)

( * ) Notice: Subject to any disclaimer, the term of this patent is extended or adjusted under 35 U.S.C. 154(b) by 725 days.

(21) Appl. No.: 12/637,056

(22) Filed: Dec. 14, 2009

(65) Prior Publication Data

US 2010/0149195 A1 Jun. 17, 2010

(30) Foreign Application Priority Data

Dec. 15, 2008 (AU) ................. 2008258132

(51) Int. Cl.
*G06F 15/80* (2006.01)
*G09G 5/00* (2006.01)
*G06T 1/00* (2006.01)

(52) U.S. Cl.
USPC ............................ 345/505; 345/629; 345/418

(58) Field of Classification Search
USPC ......................................................... 345/505
See application file for complete search history.

(56) References Cited

U.S. PATENT DOCUMENTS

| | | | |
|---|---|---|---|
| 5,757,385 A | 5/1998 | Narayanaswami et al. | |
| 6,222,550 B1 * | 4/2001 | Rosman et al. | 345/419 |
| 6,828,985 B1 * | 12/2004 | Long et al. | 345/620 |
| 2004/0223003 A1 | 11/2004 | Heirich et al. | 345/629 |
| 2006/0192983 A1 * | 8/2006 | Groarke et al. | 358/1.9 |
| 2006/0221087 A1 | 10/2006 | Diard | 345/505 |
| 2007/0159488 A1 | 7/2007 | Danskin et al. | |

OTHER PUBLICATIONS

J. Owens, Computer Graphics on a Stream Architecture. PhD thesis, Stanford University, Nov. 2002.*
Australian Office Action in Australian Application No. 2008258132, dated Oct. 15, 2010.

* cited by examiner

*Primary Examiner* — Kee M Tung
*Assistant Examiner* — Zhengxi Liu
(74) *Attorney, Agent, or Firm* — Fitzpatrick, Cella, Harper & Scinto

(57) ABSTRACT

Methods and systems for allocating workloads in a pixel sequential rendering system comprising a plurality of processors are disclosed. Such workloads typically comprise a raster pixel image comprising a plurality of graphical objects. For each scan line (540) of the raster pixel image (510), edges of the plurality of graphical objects (520, 525) that intersect with a current scan line (540) of the raster pixel image (510) are identified in a predetermined order. Spans of pixel locations on the current scan line, each defined by an adjacent pair of edges of the identified edges, are divided into segments (503, 504), one of which comprises varying pixel values. The segments (503, 504) are allocated independently of existing workloads of the processors to respective ones of the processors or processor cores for rendering.

12 Claims, 10 Drawing Sheets

LOAD BALANCING IN MULTIPLE PROCESSOR RENDERING SYSTEMS

REFERENCE TO RELATED APPLICATIONS

This application claims the benefit under 35 U.S.C. §119 of the filing date of Australian Patent Application No. 2008258132, filed on Dec. 15, 2008, hereby incorporated by reference in its entirety as if fully set forth herein.

TECHNICAL FIELD

The present invention relates generally to multi-processor systems and more particularly to load balancing amongst multiple processor cores in rendering systems.

BACKGROUND

Computer graphics is a field that requires extensive amounts of computational power. Despite recent advances in graphics processing chips and systems, there is a continual demand for the capability to render complex artworks even faster than before.

Rendering systems use various different acceleration techniques to meet the processing demands imposed by users and applications. One such technique is the utilisation of multiple processor cores to perform tasks in parallel.

When using multiple processor cores, load balancing is an important factor for optimising performance. Time division, object division and screen division are some of the methods used for load balancing.

Time division or alternate frame rendering utilises multiple processor cores by rendering alternate frames in parallel. It is generally possible in animated graphics to generate the subsequent frame of a scene by re-rendering only the updated area of the last frame. However, when using the time division method, it is not possible to efficiently use the output of a frame as input to another frame. To achieve frame-to-frame coherence in the time division method, a processor must typically wait while another processor renders the current frame so that the output (i.e., the current frame) can be used as input to the next frame.

Object division rendering aims to balance the load by distributing graphical objects that make up a scene amongst processor cores at the object level. Each processor core then renders its allocated objects to create a partial frame output of the scene. However, the partial frame output of each processor core will only comprise a subset of the objects in the entire scene. The output from each of the processor cores is then merged to produce the final frame output. The load on each processor core depends on the geometry and other properties, such as fill information, of the allocated objects. In the object division method, disadvantageously, some of the processor cores could be overloaded due to processing complex objects while others of the processor cores finish their processing and wait idle until the next frame. Another drawback of the object division method is that each pixel in the final frame will be produced by merging partial frame outputs of each processor core. Merging each pixel is a costly task, particularly when processing high resolution scenes.

Screen division rendering works by partitioning the screen into tiles, bands or stripes, and delegating these regions to separate processor cores. Screen division rendering can be further categorised into dynamic and static partitioning methods. Dynamic partitioning analyses input artwork or feedback from the processor cores to determine the size of the regions. The region size can subsequently be adjusted for each frame such that the region is constant over the frame. Any changes to the size of the region will not take place until a new frame is partitioned. Static methods simply partition the screen at a predetermined position for all frames, regardless of the input or feedback. Both these screen division methods have disadvantages. Dynamic partitioning methods have the overhead of pre-processing the artwork or post-processing feedback. Static methods are ineffective when graphical objects are concentrated in a small area of the screen, such as a user interface of a device or an application running on a general purpose computer.

A need exists to substantially overcome, or at least ameliorate one or more disadvantages associated with existing rendering methods and systems that utilise multiple processor cores.

SUMMARY

An aspect of the present invention provides a method for allocating a workload in a pixel sequential rendering system comprising a plurality of processors. The workload comprises a raster pixel image comprising a plurality of graphical objects. The method comprises, for each scan line of the raster pixel image, the steps of: identifying, in a predetermined order, edges of the plurality of graphical objects that intersect with a current scan line of the raster pixel image; dividing a span of pixel locations on the current scan line defined by an adjacent pair of edges of the identified edges into a plurality of segments, one of the plurality of segements comprising varying pixel values; and allocating, independently of existing workloads of the plurality of processors, the plurality of segments to respective ones of the plurality of processors for rendering.

In certain embodiments, each of the plurality of segments is complex.

In certain embodiments, pixel locations in the span defined by an adjacent pair of edges comprise varying pixel values.

In certain embodiments, the span of pixel locations is intentionally divided into a plurality of segments such that each segment represents a substantially equal load.

In certain embodiments, the span of pixel locations is intentionally divided into a plurality of segments such that the segments represent unequal loads.

In certain embodiments, the span of pixel locations is divided into a plurality of segments based on one or more factors in the group of factors consisting of: capacity of the plurality of processors; and processing power of the plurality of processors.

In certain embodiments, the span of pixel locations defined by an adjacent pair of edges is divided into a plurality of segments based on changes in pixel value across the span of pixel locations.

Another aspect of the present invention provides a method for allocating a workload in a rendering system comprising a plurality of processors. The workload comprises an image comprising a plurality of graphical objects. The method comprises the steps of: selecting at least one region of the image; dividing the at least one region into a plurality of sub-regions; and allocating, independently of feedback from the plurality of processors, the plurality of sub-regions to respective ones of the plurality of processors for rendering. The allocating step is performed at a pixel value generating level or stage of rendering.

The workload may comprise a raster pixel image comprising a plurality of graphical objects and the method may comprise, for each scan line of the raster pixel image, the steps of: identifying, in a predetermined order, edges of the plurality of graphical objects that intersect with a current scan line of the raster pixel image; dividing a span of pixel locations defined by an adjacent pair of edges into a plurality of segments; and allocating, independently of existing workloads of the plurality of processors, the plurality of segments to respective ones of the plurality of processors for rendering.

Another aspect of the present invention provides a pixel sequential rendering system for rendering raster pixel images comprising a plurality of graphical objects. The system comprises: memory for storing data and program instructions; a plurality of rendering processors coupled to the memory; and a processor coupled to the memory and at least one of the plurality of rendering processors. The processor is programmed to: identify edges of the plurality of graphical objects that intersect with a current scan line of the raster pixel image; divide a span of pixel locations on the current scan line defined by an adjacent pair of edges of the identified edges into a plurality of segments, one of the segments comprising varying pixel values; and allocate, independently of existing workloads of the plurality of rendering processors, the plurality of segments to respective ones of the plurality of rendering processors.

The processor may, for example, comprise a dedicated load allocating processor or may comprise one of the rendering processors. The plurality of rendering processors may be arranged in a pipelined configuration or a parallel configuration.

Another aspect of the present invention provides a system for rendering raster pixel images comprising a plurality of graphical objects. The system comprises: memory for storing data and program instructions; a plurality of rendering processors coupled to the memory; and a processor coupled to the memory and at least one of the plurality of rendering processors. The processor is programmed to: select at least one region of the image; divide the at least one region into a plurality of sub-regions; and allocate, independently of feedback from the plurality of processors, the plurality of sub-regions to respective ones of the plurality of processors for rendering. The allocation is performed at a pixel value generating level or stage of rendering.

The workload may comprise a raster pixel image comprising a plurality of graphical objects and the processor may be programmed, for each scan line of the raster pixel image, to: identify, in a predetermined order, edges of the plurality of graphical objects that intersect with a current scan line of the raster pixel image; divide a span of pixel locations defined by an adjacent pair of edges into a plurality of segments; and allocate, independently of existing workloads of the plurality of processors, the plurality of segments to respective ones of the plurality of processors for rendering.

The processor may, for example, comprise a dedicated load allocating processor or may comprise one of the rendering processors. The plurality of rendering processors may be arranged in a pipelined configuration or a parallel configuration.

Another aspect of the present invention provides a computer readable medium comprising a computer program recorded therein for allocating a workload in a pixel sequential rendering system comprising a plurality of processors. The workload comprises a raster pixel image comprising a plurality of graphical objects. The computer program product comprises: computer program code means for identifying, in a predetermined order, edges of the plurality of graphical objects that intersect with a current scan line of the raster pixel image; computer program code means for dividing a span of pixel locations on the current scan line defined by an adjacent pair of edges of the identified edges into a plurality of segments, one of the segments comprising varying pixel values; and computer program code means for allocating, independently of existing workloads of the plurality of processors, the plurality of segments to respective ones of the plurality of processors for rendering.

Another aspect of the present invention provides a computer readable medium comprising a computer program recorded therein for allocating a workload in a rendering system comprising a plurality of processors. The workload comprises an image comprising a plurality of graphical objects. The computer program product comprises: computer program code means for selecting at least one region of the image; computer program code means for dividing the at least one region into a plurality of sub-regions; and computer program code means for allocating, independently of feedback from the plurality of processors, the plurality of sub-regions to respective ones of the plurality of processors for rendering. The computer program code means for allocating is adapted to perform the allocation at a pixel value generating level or stage of rendering.

BRIEF DESCRIPTION OF THE DRAWINGS

A small number of embodiments of the present invention are described hereinafter with reference to the accompanying drawings, in which.

Where reference is made in any one or more of the accompanying drawings to steps and/or features, which have the same reference numerals, those steps and/or features have for the purposes of this description the same function(s) or operation(s), unless the contrary intention appears.

DETAILED DESCRIPTION

Embodiments of the present invention described hereinafter relate to methods and systems for balancing a rendering workload amongst multiple processors or processor cores in a rendering system. The load balancing method is described in detail hereinafter using several embodiments. While certain embodiments have the multiple processors or processor cores arranged in a pipelined configuration, the present invention is not intended to be limited in this manner. For example, the multiple processors or processor cores may alternatively be arranged in a parallel configuration.

The load balancing method functions by dividing work between processors or processor cores at a pixel-generating level and may be based on rendering complexity. In certain embodiments, the workload may be allocated to the processors or processor cores independently of feedback from the processors or processor cores. Such feedback is typically indicative of a current or existing workload of a processor or processor core.

Use of the term "processor" in the present specification includes a "processor core" within its intended scope of meaning. That is, embodiments of the present invention may be practised using a system comprising multiple independent processors or a system comprising a processor or processor unit which comprises multiple processor cores.

Figure 1A:
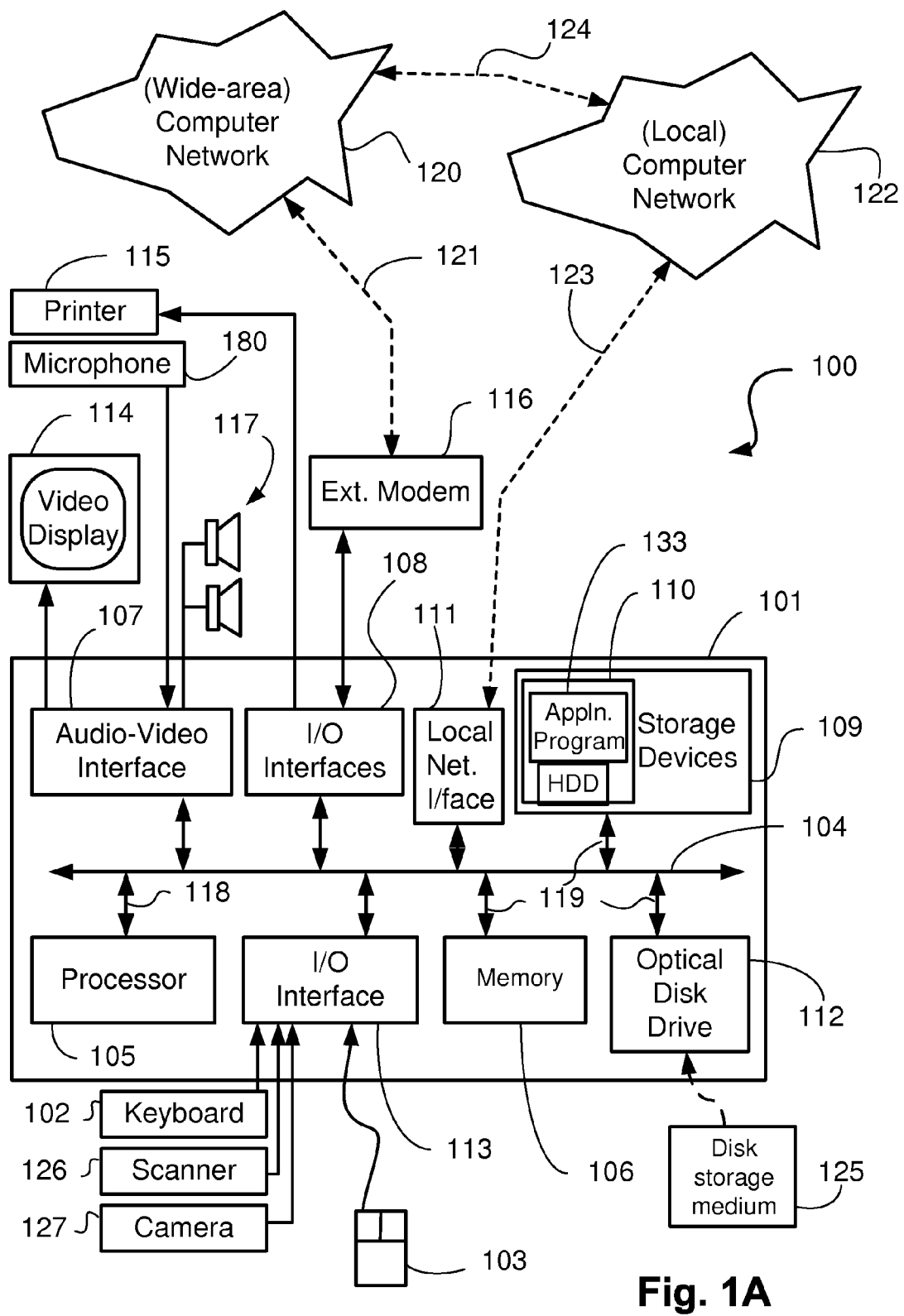
FIGS. 1A and 1B are schematic block diagrams of a general purpose computer with which embodiments of the present invention may be practised.
Figure 1B:
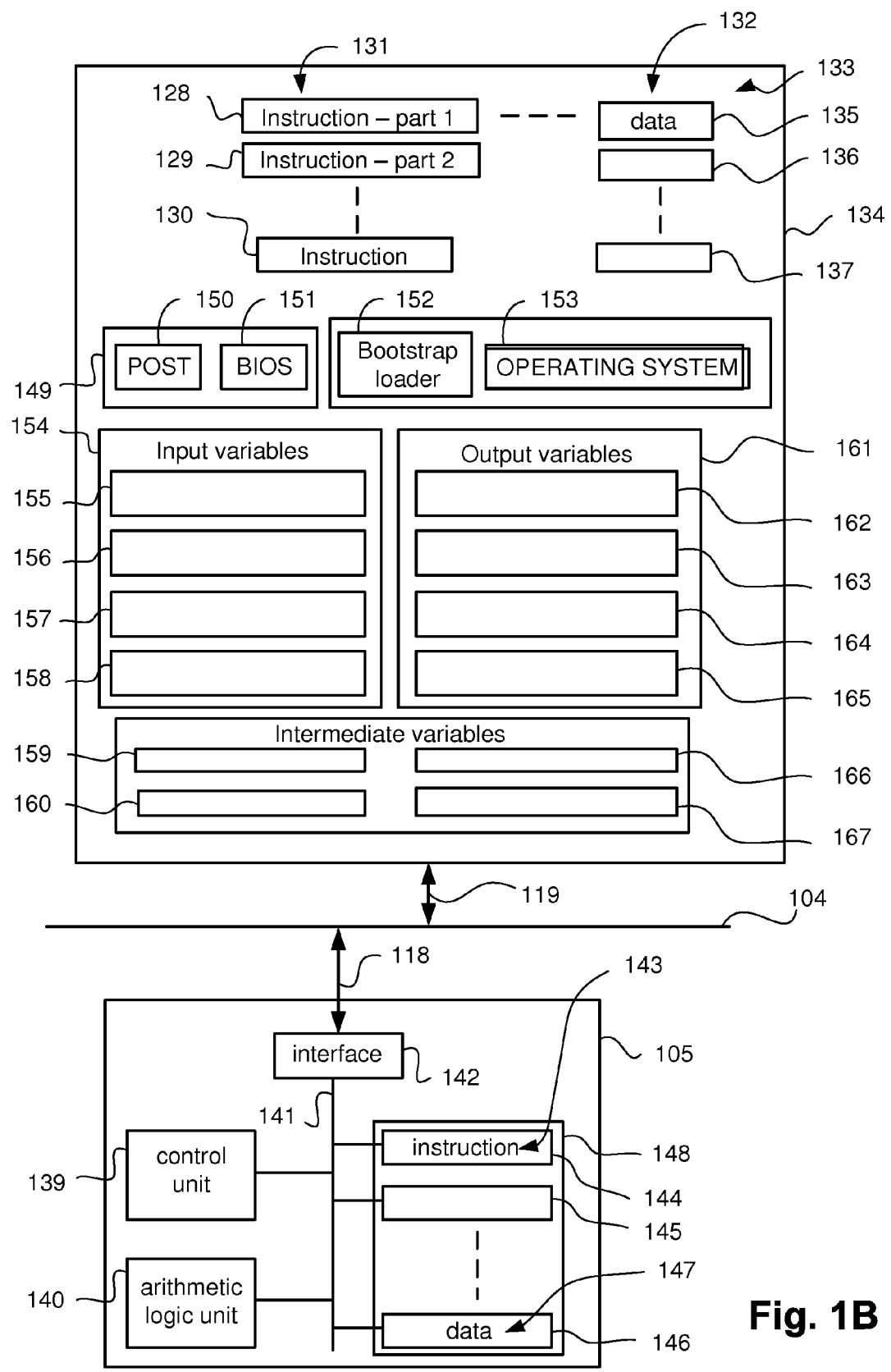

Embodiments of the present invention may be practised using a computer system 100, such as that illustrated in FIGS. 1A and 1B of the accompanying drawings.

FIGS. 1A and 1B collectively form a schematic block diagram of a general purpose computer system 100, with which embodiments of the present invention can be practiced.

As seen in FIG. 1A, the computer system 100 is formed by a computer module 101, input devices such as a keyboard 102, a mouse pointer device 103, a scanner 126, a camera 127, and a microphone 180, and output devices including a printer 115, a display device 114 and loudspeakers 117. An external Modulator-Demodulator (Modem) transceiver device 116 may be used by the computer module 101 for communicating to and from a communications network 120 via a connection 121. The network 120 may be a wide-area network (WAN), such as the Internet or a private WAN. Where the connection 121 is a telephone line, the modem 116 may be a traditional "dial-up" modem. Alternatively, where the connection 121 is a high capacity (e.g., cable) connection, the modem 116 may be a broadband modem. A wireless modem may also be used for wireless connection to the network 120.

The computer module 101 typically includes at least one processor unit 105 and a memory unit 106, for example, formed from semiconductor random access memory (RAM) and semiconductor read only memory (ROM). The at least one processor unit 105 may comprise multiple processors or multiple processor cores, for example, arranged in a pipelined or parallel configuration. The module 101 also includes an number of input/output (I/O) interfaces including an audio-video interface 107 that couples to the video display 114, loudspeakers 117 and microphone 180, an I/O interface 113 for the keyboard 102, mouse 103, scanner 126, camera 127 and optionally a joystick (not illustrated), and an interface 108 for the external modem 116 and printer 115. In some implementations, the modem 116 may be incorporated within the computer module 101, for example within the interface 108. The computer module 101 also has a local network interface 111 which, via a connection 123, permits coupling of the computer system 100 to a local computer network 122, known as a Local Area Network (LAN). As also illustrated, the local network 122 may also couple to the wide network 120 via a connection 124, which would typically include a so-called "firewall" device or device of similar functionality.

The interface 111 may be formed by an Ethernet™ circuit card, a Bluetooth™ wireless arrangement or an IEEE 802.11 wireless arrangement.

The interfaces 108 and 113 may afford either or both of serial and parallel connectivity, the former typically being implemented according to the Universal Serial Bus (USB) standards and having corresponding USB connectors (not illustrated). Storage devices 109 are provided and typically include a hard disk drive (HDD) 110. Other storage devices such as a floppy disk drive and a magnetic tape drive (not illustrated) may also be used. An optical disk drive 112 is typically provided to act as a non-volatile source of data. Portable memory devices, such optical disks (e.g., CD-ROM, DVD), USB-RAM, and floppy disks for example may then be used as appropriate sources of data to the system 100.

The components 105 to 113 of the computer module 101 typically communicate via an interconnected bus 104 and in a manner which results in a conventional mode of operation of the computer system 100 known to those skilled in the relevant art. Examples of computers on which the described arrangements or embodiments can be practised include IBM-PC's and compatibles, Sun Sparcstations, Apple Mac™ or similar computer systems.

The methods and processes described hereinafter (e.g., the methods of FIGS. 2 and 3A) may be implemented as software, such as one or more application programs 133 executable within the computer system 100. In particular, the steps of the methods described hereinafter (e.g., the methods of FIGS. 2 and 3A) may be implemented as programmed instructions 131 in the software 133 that are executed by the computer system 100. The software instructions 131 may be formed as one or more code modules, each for performing one or more particular tasks. The software may also be divided into two separate parts, in which a first part and the corresponding code modules performs the methods described hereinafter and a second part and the corresponding code modules manage a user interface between the first part and the user.

The software 133 is generally loaded into the computer system 100 from a computer readable medium (the software 133 and computer readable medium together form a computer program product), and is then typically stored in the HDD 110, as illustrated in FIG. 1A, or the memory 106, after which the software 133 can be executed by the computer system 100. In some instances, the application programs 133 may be supplied to the user encoded on one or more CD-ROM 125 and read via the corresponding drive 112 prior to storage in the memory 110 or 106. Alternatively the software 133 may be read by the computer system 100 from the networks 120 or 122 or loaded into the computer system 100 from other computer readable media. Computer readable storage media refers to any storage medium that participates in providing instructions and/or data to the computer system 100 for execution and/or processing. Examples of such storage media include floppy disks, magnetic tape, CD-ROM, a hard disk drive, a ROM or integrated circuit, USB memory, a magneto-optical disk, or a computer readable card such as a PCMCIA card and the like, whether or not such devices are internal or external to the computer module 101. Examples of computer readable transmission media that may also participate in the provision of software, application programs, instructions and/or data to the computer module 101 include radio or infra-red transmission channels as well as a network connection to another computer or networked device, and the Internet or Intranets including email transmissions and information recorded on Websites and the like.

The second part of the application programs 133 and the corresponding code modules mentioned above may be executed to implement one or more graphical user interfaces (GUIs) to be rendered or otherwise represented upon the display 114. Through manipulation of typically the keyboard 102 and the mouse 103, a user of the computer system 100 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 117 and user voice commands input via the microphone 180.

FIG. 1B is a detailed schematic block diagram of the at least one processor unit 105 and a "memory" 134. While only a single processor is shown in FIGS. 1A and 1B, those skilled in the art will appreciate that multiple processors or processor cores are used to practise embodiments of the present invention. The memory 134 represents a logical aggregation of all the memory devices (including the HDD 110 and semiconductor memory 106) that can be accessed by the computer module 101 in FIG. 1A.

When the computer module 101 is initially powered up, a power-on self-test (POST) program 150 executes. The POST program 150 is typically stored in a ROM 149 of the semiconductor memory 106. A program permanently stored in a hardware device such as the ROM 149 is sometimes referred to as firmware. The POST program 150 examines hardware within the computer module 101 to ensure proper functioning, and typically checks the processor 105, the memory (109, 106), and a basic input-output systems software (BIOS) module 151, also typically stored in the ROM 149, for correct operation. Once the POST program 150 has run successfully, the BIOS 151 activates the hard disk drive 110. Activation of the hard disk drive 110 causes a bootstrap loader program 152 that is resident on the hard disk drive 110 to execute via the processor 105. This loads an operating system 153 into the RAM memory 106 upon which the operating system 153 commences operation. The operating system 153 is a system level application, executable by the processor 105, to fulfil various high level functions, including processor management, memory management, device management, storage management, software application interface, and generic user interface.

The operating system 153 manages the memory 109, 106 in order to ensure that each process or application running on the computer module 101 has sufficient memory in which to execute without colliding with memory allocated to another process. Furthermore, the different types of memory available in the system 100 must be used properly so that each process can run effectively. Accordingly, the aggregated memory 134 is not intended to illustrate how particular segments of memory are allocated (unless otherwise stated), but rather to provide a general view of the memory accessible by the computer system 100 and how such is used.

The processor 105 includes a number of functional modules including a control unit 139, an arithmetic logic unit (ALU) 140, and a local or internal memory 148, sometimes called a cache memory. The cache memory 148 typically includes a number of storage registers 144-146 in a register section. One or more internal buses 141 functionally interconnect these functional modules. The processor 105 typically also has one or more interfaces 142 for communicating with external devices via the system bus 104, using a connection 118.

The application program 133 includes a sequence of instructions 131 that may include conditional branch and loop instructions. The program 133 may also include data 132 which is used in execution of the program 133. The instructions 131 and the data 132 are stored in memory locations 128-130 and 135-137 respectively. Depending upon the relative size of the instructions 131 and the memory locations 128-130, a particular instruction may be stored in a single memory location as depicted by the instruction shown in the memory location 130. Alternately, an instruction may be segmented into a number of parts each of which is stored in a separate memory location, as depicted by the instruction segments shown in the memory locations 128-129.

In general, the processor 105 is given a set of instructions which are executed therein. The processor 105 then waits for a subsequent input, to which it reacts to by executing another set of instructions. Each input may be provided from one or more of a number of sources, including data generated by one or more of the input devices 102, 103, data received from an external source across one of the networks 120, 122, data retrieved from one of the storage devices 106, 109 or data retrieved from a storage medium 125 inserted into the corresponding reader 112. The execution of a set of the instructions may in some cases result in output of data. Execution may also involve storing data or variables to the memory 134.

The embodiments disclosed hereinafter may use input variables 154 that are stored in the memory 134 in corresponding memory locations 155-158. The embodiments disclosed hereinafter may produce output variables 161 that are stored in the memory 134 in corresponding memory locations 162-165. Intermediate variables may be stored in memory locations 159, 160, 166 and 167.

The register section 144-146, the arithmetic logic unit (ALU) 140, and the control unit 139 of the processor 105 work together to perform sequences of micro-operations needed to perform "fetch, decode, and execute" cycles for every instruction in the instruction set making up the program 133. Each fetch, decode, and execute cycle comprises:

(a) a fetch operation, which fetches or reads an instruction 131 from a memory location 128;

(b) a decode operation in which the control unit 139 determines which instruction has been fetched; and (c) an execute operation in which the control unit 139 and/or the ALU 140 execute the instruction.

Thereafter, a further fetch, decode, and execute cycle for the next instruction may be executed. Similarly, a store cycle may be performed by which the control unit 139 stores or writes a value to a memory location 132.

Each step or sub-process in the methods or processes described hereinafter is associated with one or more segments of the program 133, and is performed by the register section 144-147, the ALU 140, and the control unit 139 in the processor 105 working together to perform the fetch, decode, and execute cycles for every instruction in the instruction set for the noted segments of the program 133.

The methods or processes described hereinafter may alternatively be implemented in dedicated hardware such as one or more integrated circuits. Such dedicated hardware may include graphics processors, digital signal processors, or one or more microprocessors and associated memories. An embodiment using dedicated hardware is described hereinafter with reference to FIG. 4.

Figure 2:
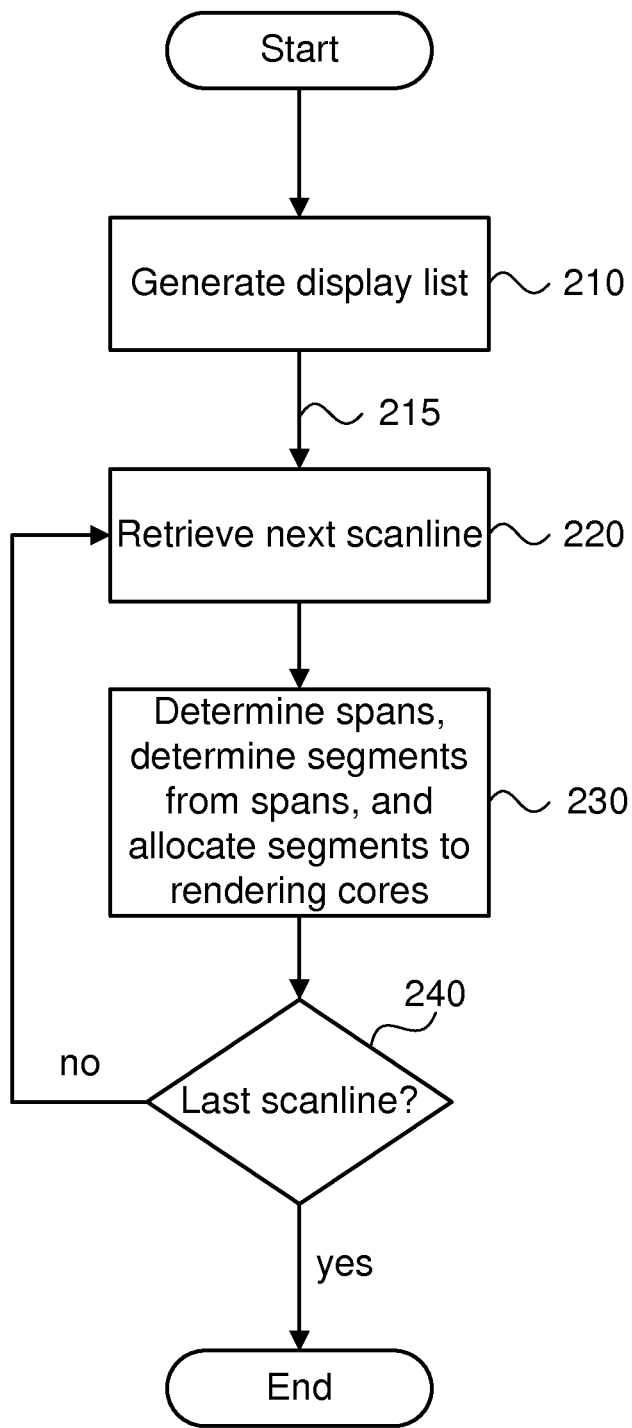
FIG. 2 is a flow diagram of a rendering process or method in accordance with an embodiment of the present invention.

FIG. 2 is a flow diagram of a rendering process or method. The rendering process typically starts with generation of a display list at step 210. Alternatively, the display list may be generated prior to the rendering process. Display list generation involves decomposing graphical object descriptions in an image or scene into primitives such as edges and fills. Once display list generation at step 210 is complete, a rendering loop comprising steps 220, 230 and 240 begins. Processing in the rendering loop begins with retrieval or loading of a scan-line at step 220. Load balancing is achieved by dividing and allocating the workload of rendering the scan-line retrieved in step 220 amongst multiple processors or processor cores at step 230. At step 240, a determination is made whether the current scan-line is the last scan-line of the image or scene. If not (no), the next scan-line is retrieved at step 220. Alternatively, if the current scan-line is the last scan-line (yes), at step 240, the process terminates.

Step 230 of the method of FIG. 2 may comprise the sub-steps of: identifying, in a predetermined order, edges of the plurality of graphical objects that intersect with a current scan line of the raster pixel image; dividing a span of pixel locations on the current scan line defined by an adjacent pair of edges of the identified edges into a plurality of segments; and allocating, independently of feedback from the plurality of processors, the plurality of segments to respective ones of the plurality of processors for rendering. One of the plurality of segments may comprise varying pixel values.

The plurality of segments may be allocated to respective ones of the plurality of processors independently of existing workloads of the plurality of processors. Pixel locations in the span defined by an adjacent pair of edges may comprise varying pixel values. The span of pixel locations may be intentionally divided into a plurality of segments such that each segment represents a substantially equal processor load. Alternatively, the span of pixel locations may be intentionally divided into a plurality of segments such that the segments represent unequal loads. The span of pixel locations may be divided into a plurality of segments based on one or more factors in the group of factors consisting of: capacity of the plurality of processors; and processing power of the plurality of processors. The capacity of a processor may, for example, be based on the number of instructions that can be processed over a certain amount of time. The determination of the processor capacity can be adjusted according to the capacity requirements of other known processes currently being performed, or to be performed, by the processor. The span of pixel locations defined by an adjacent pair of edges may be divided into a plurality of segments based on changes in pixel value across the span of pixel locations.

Figure 3A:
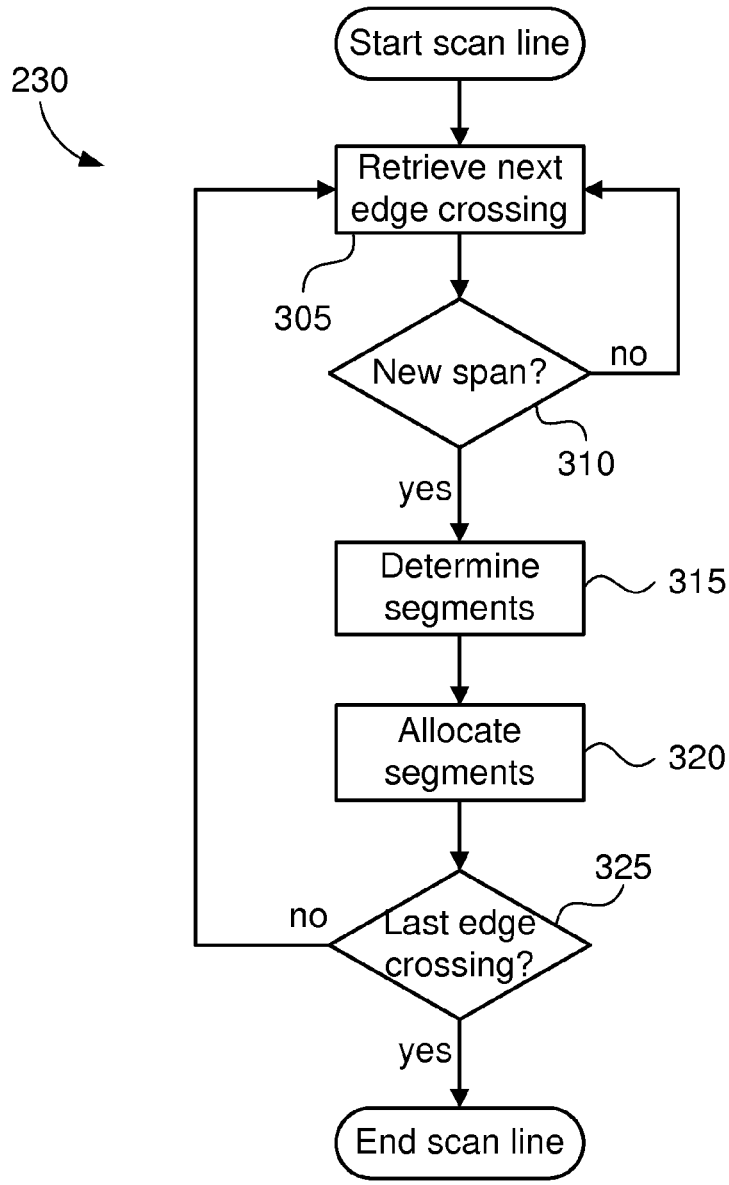
FIG. 3A is a flow diagram of a method for allocating a rendering workload for a current scan-line amongst multiple processors in accordance with an embodiment of the present invention.

FIG. 3A is a flow diagram of a method or process for performing load balancing by dividing and allocating a rendering workload for a current scan-line amongst multiple processors or processor cores. In particular, the process of FIG. 3A may be practised to perform step 230 of the process of FIG. 2.

Figure 3B:
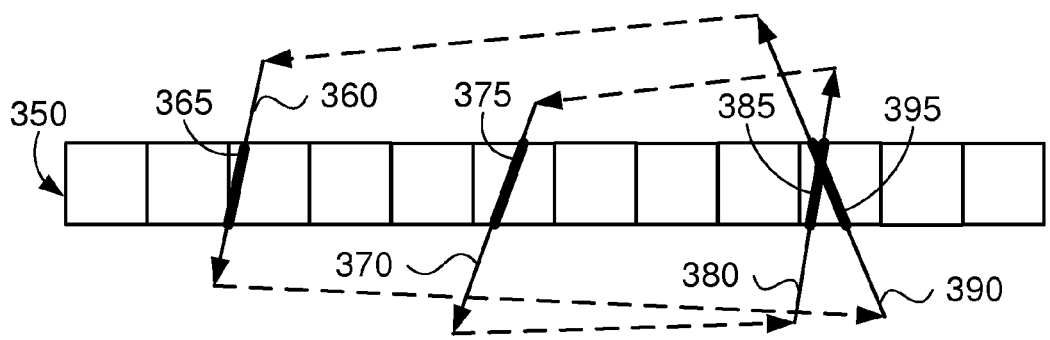
FIG. 3B is a diagram illustrating a scan-line intersecting with edges of graphical objects.

FIG. 3B is a diagram illustrating a scan-line 350 intersecting with edges 360, 370, 380, 390 that describe two graphical objects. Edges 360 and 390 belong to the first graphical object and edges 370 and 380 belong to the second graphical object. An edge crossing is created when an edge intersects with a given scan-line. Edge crossings 365, 375, 385, 395 are processed in a predetermined order, in this instance from left to right.

Returning to the method of FIG. 3A, an edge crossing is retrieved at step 305. Then, a determination is made at step 310 whether the retrieved edge crossing forms one end of a new span of pixel locations, such that the compositing priority of contributing graphical objects stays constant during the span of pixel locations. If not (no), processing returns to step 305 to retrieve the next edge crossing. If a span is determined (yes), at step 310, the span may be partitioned or divided into segments, depending on the processing complexity of the span. Division of the span into segments, which is performed at step 315, can be performed in various ways and may be based on the processing complexity of the span. For example, division of the span into segments may be based on changes in pixel value across the span of pixel locations. Alternatively, the span of pixel locations may be intentionally divided into multiple segments such that each segment represents a substantially equally balanced workload. Alternatively, the span of pixel locations may be intentionally divided into multiple segments such that the segments represent unequally balanced workloads. Alternatively, the span of pixel locations may be divided into multiple segments based on the known capacity of the processors and/or the processing power of the processors. The segments are then allocated to the processors or rendering processor cores at step 320 independently of feedback from the processors or rendering processor cores. At step 325, a determination is made whether the current edge crossing is the last edge crossing. If not (no), processing returns to step 305 for retrieval of the next edge crossing. The process of determining spans at step 310, determining segments of a span at step 315, and allocating spans at step 320 is performed repeatedly until all edge crossings for the current scan-line have been processed. Once all the edge crossings for the current scan-line have been processed (yes), at step 325, the process terminates.

An alternative embodiment works based on regions to be rendered, for example, to a screen. Instead of working in a scan-line manner as described above, the alternative embodiment works by dividing the image to be rendered into a number of regions. Such regions may be based on the objects that are to be rendered. A selected region of the screen is then divided into a number of sub-regions, for example, based on any overlapping objects. Each two dimensional sub-region can then be allocated to a processor in a similar manner as performed for scan line rendering. Any complex two dimensional sub-regions can be further divided to allow the rendering workload to be split between the processors, independently of feedback.

The load balancing methods described hereinbefore address certain drawbacks of existing techniques, which attempt to spread the workload using screen, time or object division methods.

Unlike time division methods, all the rendering processor cores operate on a single frame. Frame-to-frame coherence can be efficiently used to render successive frames of certain animation sequences without incurring a delay that exists in the time division method.

Furthermore, embodiments of the load balancing method described hereinbefore do not suffer from load imbalances that occur in screen division methods when objects are concentrated on a small area of the screen or when updating a small area of successive frames. Screen division methods may incur a large overhead when pre-processing input to assess how the screen should be partitioned or when using feedback to partition the screen for a successive frame. As screen division methods are performed before rendering begins, such methods do not have access to much information about the complexity of the work assigned to each processor or processor core. Embodiments of the load balancing method described hereinbefore overcome this issue by dividing and allocating work amongst the multiple processors or processor cores based on the complexity of each span at render time. Rendering bottlenecks present in object division methods are overcome or ameliorated by distributing segments of similar rendering complexity for each significantly complex span among the rendering processors or processor cores rather than distributing objects with various rendering complexity. Distributing objects with different complexities could disadvantageously result in a rendering processor or processor core being overloaded and ultimately slowing down the entire system.

Figure 4:
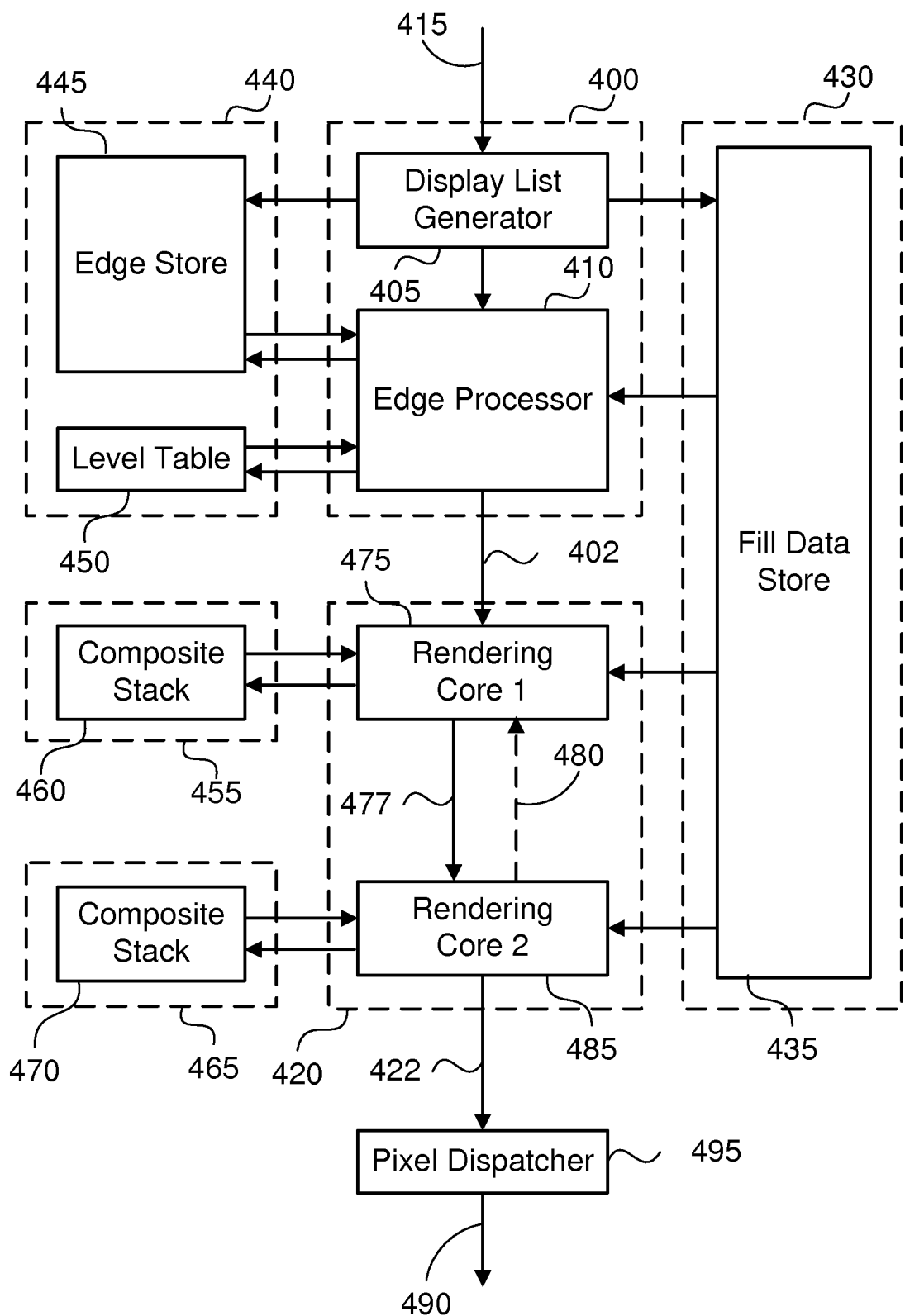
FIG. 4 is a schematic block diagram of a multi-processor rendering system in accordance with an embodiment of the present invention.

FIG. 4 is a schematic block diagram of a multi-processor core rendering system in accordance with an embodiment of the invention. Data flow commences from an input source providing graphical object descriptions 415. The input source could, for example, comprise read only memory, random access memory, a storage device or a streaming data connection such as a network or data bus. The graphical object descriptions 415 are passed into a graphical object description processing module 400. The graphical object description processing module 400 interprets the object descriptions and issues rendering commands to the multi-processor rendering engine 420. The output stream of the multi-processor rendering engine 420 is routed to a pixel dispatcher 495 which writes pixels 490 to an intended destination. According to the embodiment shown in FIG. 4, the rendering processor cores 475 and 485 in the multi-processor rendering engine 420 are arranged in a pipelined configuration. In other embodiments, however, the multiple cores may be arranged in a parallel configuration.

The graphical object description processing module 400 comprises two key sub-modules, namely a display list generator 405, and an edge processor 410. Referring to the method of FIG. 2, display list generation at step 210 may be implemented by the display list generator 405 and comprises decomposing graphical object descriptions into primitives such as edges and fills. The edges are written to the edge store 445 and fill data is written to the fill data store 430. The edge processor 410 uses these edges to determine spans, and maintains a list of contributing fills in the level table 450.

Both the edge store 445 and the level table 450 reside in local memory 440 which is local to the graphical object description processing module 400. The fill data store 435 resides in shared memory 430, and is available to both the graphical object description processing module 400 and the rendering cores 475 and 485.

Once the display list generator 405 has decomposed the graphical object descriptions into primitives, the edge processor 410 begins sorting the edges. The edges in the edge store 445 are sorted into the order that they would be encountered as the system tracks across the frame, scan-line by scan-line. For each scan-line, the edge processor 410 will retrieve edges that intersect with the current scan-line to determine spans (as described hereinbefore with reference to FIGS. 3A and 3B) and to update the level table 450. The level table 450 is used to maintain information about contributing fills, typically sorted by their priority. Each entry in the level table 450 contains information referring to the current state of each contributing fill, such as a pointer to the fill data in the fill data store 435, a priority which details the order in which the levels should be sorted, and activation counts which detail how many times the current fill has been activated by an edge crossing where a non-zero activation count indicates the fill is active.

For each determined span, the edge processor 410 is responsible for sending commands containing information about contributing fills, span coordinates and length to the multi-processor rendering engine 420. The commands relating to span details are communicated through a queue 402 (FIFO) that couples the edge processor 410 and the rendering processor core 475 of the multi-processor rendering engine 420. The multi-processor rendering engine 420 contains two rendering processor cores 475 and 485 arranged in a pipelined configuration. Rendering processor core 475 sends messages to rendering processor core 485 through the queue 477 (FIFO) that couples the rendering processor cores. Rendering processor core 475 has a composite stack 460 associated with it. The composite stack 460 resides in local memory 455 which is local to rendering processor core 475. Similarly, rendering processor core 485 has a composite stack 470 associated with it, residing in local memory 465 which is local to rendering core 485. Rendering processor core 475 communicates with rendering processor core 485 through the queue 477.

The composite stacks 460 and 470 of the rendering processor cores 475 and 485, which take part in rendering a given span, must contain a reference to each fill that is active for that particular span. Not all the information in the level table 450 is required by the rendering processor cores 475 and 485. For example, information such as activation counts is only maintained in the level table 450

When processing edge crossings in a scan-line, the edge processor 410 updates the level table 450 and sends update messages to rendering core 475. Rendering processor core 475 then updates its composite stack 460 and propagates the message to rendering processor core 485, which updates its composite stack 470. Thus, the composite stacks 460 and 470 are kept up to date so that they can be used when the rendering processor cores 475 and 485 render a span.

The commands containing rendered pixel data produced by the multi-processor rendering engine 420 are sent to the pixel dispatcher 495 through the queue 422 (FIFO). The pixel dispatcher 495 is responsible for decoding these commands and writing pixels to the intended destination. The destination could, for example, be a frame buffer or a stream depending on the requirements of the rendering system. In the present embodiment, rendering processor core 475 sends the rendered output to the pixel dispatcher 495 via the queue 477 and rendering processor core 485. Rendering processor core 485 is responsible for forwarding the pixel data commands received from rendering processor core 475, as well as performing the rendering work allocated to it and sending the pixel data commands to the pixel dispatcher 495. In an alternate embodiment, the rendering processor cores could directly write the rendered output to a destination such as a frame buffer without sending the pixel data commands through the pipeline.

Rendering processor core 475 is responsible for load balancing in the presently described embodiment by dividing or allocating the workload between the rendering processor cores 475 and 485. However, load balancing could alternatively be performed by another rendering processor core or an altogether separate processor or processor core. The rendering workload is divided such that the rendering processor cores 475 and 485 complete their allocated tasks at approximately the same time, thereby reducing rendering bottlenecks in this pipeline model. In the present embodiment, rendering processor core 475 divides the rendering workload, independently of the existing workload of any rendering processor cores. In an alternate embodiment, rendering processor core 485 provides feedback 480 representative of its current or existing workload to rendering processor core 475. The feedback information 480 may be used by rendering processor core 475 when dividing or allocating the workload amongst the rendering processor cores.

Figure 5A:
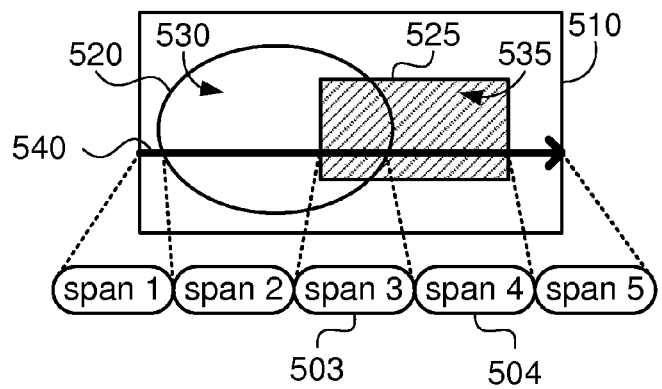
FIGS. 5A, 5B and 5C are diagrams for illustrating load balancing amongst multiple rendering processors in accordance with an embodiment of the present invention.
Figure 5B:
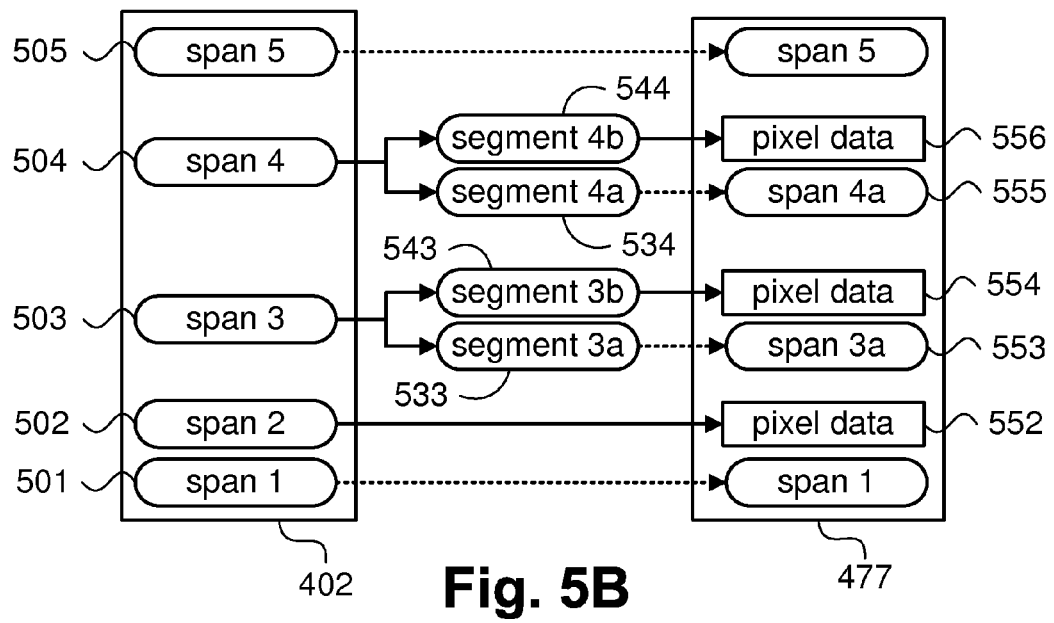
Figure 5C:
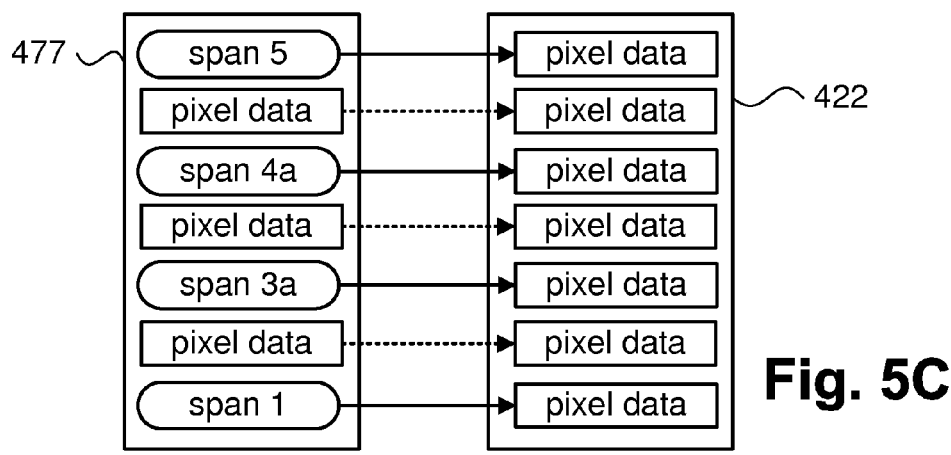

FIG. 5A, FIG. 5B and FIG. 5C illustrate load balancing amongst multiple rendering processors or rendering processor cores in a multi-processor rendering system and are described with reference to the multi-processor rendering system of FIG. 4.

FIG. 5A illustrates how the edge processor 410 determines spans while processing a scan-line 540 of a frame 510. The frame 510 includes two objects, namely, an ellipse 520 and a rectangle 525. The ellipse 520 is filled with a flat fill 530 with opacity and the rectangle 525 is filled with a gradient 535 with opacity. The edge processor 410 processes the scan-line 540 from left to right, sending commands containing span details to the multi-processor rendering engine 420 in the same order as the spans are determined. In the system of FIG. 4, the edge processor 410 sends commands containing span details to the rendering processor core 475 in the same order that the spans are determined in.

FIG. 5B illustrates how rendering core 475 processes span data that arrives in the input queue 402 and outputs the result into the output queue 477. Rendering processor core 475 inspects each command and makes a decision either to forward the span details to rendering processor core 485, or to process the span details directly. The decision to forward or process a span may be based on criteria as simple as whether the span count is odd or even. Alternatively, the decision may be more dynamically based, such as checking the feedback 480 of rendering processor core 485. Referring to FIG. 5B, span 2 502 in the input queue 402 of rendering processor core 475, is an example of a span that is processed directly by rendering processor core 475. Once the span 2 502 is rendered, the resulting pixel data 552 is sent to the pixel dispatcher 495 via the queue 477 and the rendering processor core 485. Spans 1 501 and 5 505 are examples of spans that are forwarded to rendering processor core 485 without further processing. Depending on one or more attributes of a span, rendering processor core 475 may choose to determine segments (e.g., at step 315 of the method of FIG. 3) by partitioning the span. The purpose of partitioning or dividing a span into segments is to distribute the processing load of that span among multiple rendering processor cores. In the example of FIG. 5B, the rendering processor core 475 partitions span 3 503 into two segments, segment 3a 533 and segment 3b 543. Segment 3a 533 will be packaged as a new span 553 and allocated to rendering processor core 485. Rendering processor core 475 allocates segment 3b 543 to itself and then renders the segment 3b 543. The pixel data 554 resulting from rendering segment 3b 543 is sent to the pixel dispatcher 495 via the queue 477 and rendering processor core 485. A similar process is followed for span 4 504 producing segment 4a 534, segment 4b 544, span 4a 555 and pixel data 556. Segments 3a 553 and 4a 555 in the output queue 477 are examples of segments that are allocated to rendering processor core 485, packaged as spans 553 and 555, respectively.

FIG. 5C illustrates how rendering processor core 485 processes the data that is sent from rendering processor core 475. The data in the output queue 477 from rendering processor core 475 is supplied as input data for rendering processor core 485. In the present embodiment, rendering processor core 485 processes all received span commands. The resulting pixel data from rendering these spans are sent to the pixel dispatcher 495 via the output queue 422 of rendering processor core 485. Rendering processor core 475 also forwards any pixel data that is in the queue 477 to the pixel dispatcher 495. In an alternate embodiment comprising a third rendering processor core, rendering processor core 485 could perform some further load balancing tasks similar to the tasks performed by rendering processor core 475.

In certain embodiments, spans with contributing fills including gradients or bitmaps are considered to be complex spans. Generally, generating pixel values for a span that includes gradients or bitmaps is more computationally expensive than generating pixel values for a span that only includes flat fills. Each pixel of a complex span is calculated separately due to the pixel colour of gradients or bitmaps possibly varying along the length of that span. Therefore, the workload associated with such complex spans will be dependent on the length of the span. In the embodiment of FIG. 4, rendering processor core 475 determines (e.g., at step 315 of the method of FIG. 3) two segments by partitioning or dividing a complex span and allocates the segments to the rendering processor cores. This process assists in balancing the load amongst all of the rendering processor cores, thus reducing rendering bottlenecks. Referring to FIG. 5A, contributing fills of spans 3 503 and 4 504 include the gradient fill 535 that is used to fill the rectangular object 525. Referring to FIG. 5B, these spans are partitioned or divided into segments, which are allocated amongst the rendering processor cores by rendering processor core 475. Colour values of simple spans that only include flat fills are typically constant throughout the entire span.

The required workload is independent of span length for simple spans. Generally, adjacent simple spans require a similar amount of processing due to having mostly the same contributing fills. Therefore, adjacent simple spans may be processed by rendering processor cores in a round robin fashion without segmenting.

Referring to FIGS. 3 and 4, the edge processor 410 is responsible for determining spans at step 310 and communicating the necessary details such as span coordinates, span length and contributing fills to the multi-processor rendering engine 420. The span coordinates and length may be calculated when determining spans from adjacent edge crossings. Contributing fill data is maintained in the level table 450 and updated according to fill information associated with edge crossings. An edge crossing can activate or de-activate a fill. As each edge crossing is processed, the edge processor looks through the level table 450 for the fill information associated with that edge crossing. However, the level table 450 may not yet contain a level table entry for the fill in question. If no level table entry is found, the edge processor 410 reads the information required from the fill data store 435 and creates a level table entry with the correct activation count. This newly created level table entry is inserted into the level table 450 at the correct point, sorted by priority of the fill. If the edge processor 410 finds that a relevant level table entry for the current fill is already present in the level table 450, the activation count in that level table entry is updated depending on whether the edge crossing in question was a de-activating or activating edge crossing. If the edge crossing in question is a de-activating edge crossing, and the activation count of the level table entry becomes zero, the related level table entry may be removed from the level table 450 as it is no longer active.

Figure 6A:
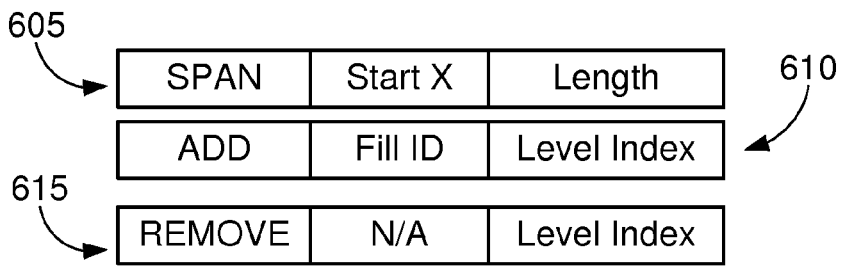
FIG. 6A is a subset of commands used to communicate details of spans to rendering processors in a multi-processor rendering system.

The span details may be communicated using the commands, SPAN 605, ADD 610 and REMOVE 615, as shown in FIG. 6A. FIG. 6A comprises a subset of commands that could be used in the embodiment of FIG. 4. The SPAN command 605 comprises a header to indicate the type of the command, a starting x coordinate and the length of the span. The Y coordinate could be communicated once per scan-line, therefore it is not necessarily included in every SPAN command. The level table modifications may be propagated using the ADD 610 and REMOVE 615 commands. Both of the ADD 610 and REMOVE 615 commands comprise a header and a level index referring to the location and the priority in the composite stack. The ADD command 610 also comprises a field for a fill ID that refers to fill details located in the fill data store 435.

Figure 6B:
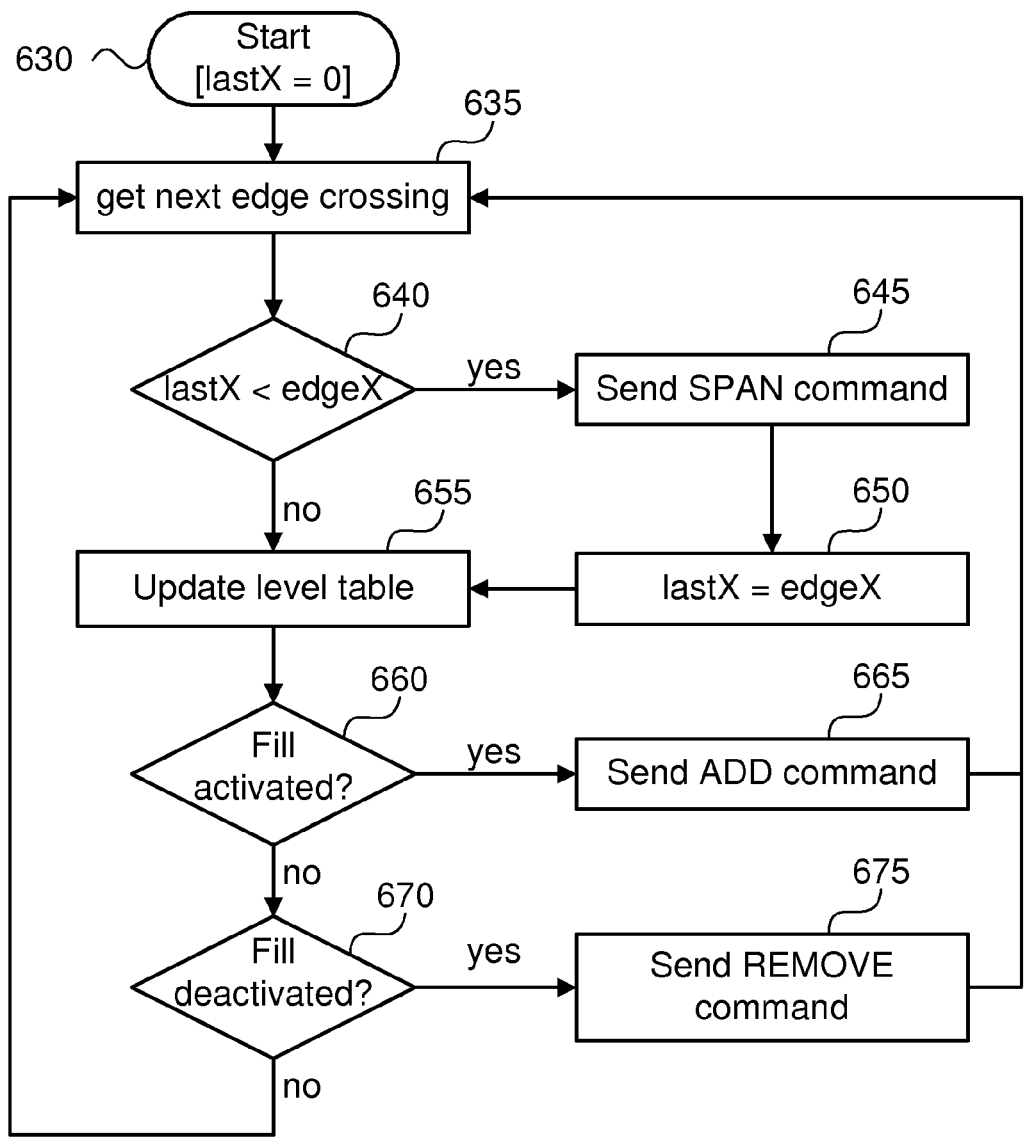
FIG. 6B is a flow diagram of a method for communicating span details to rendering processors in a multi-processor rendering system in accordance with an embodiment of the present invention.

FIG. 6B is a flow diagram of a process or method for determining and communicating span details to rendering processors in a multi-processor rendering engine or system. For example, FIG. 6B describes steps in a processing loop that the edge processor 410 iterates through for each scanline. The edge processor 410 maintains a variable 'lastX' to keep track of the x coordinate of the last edge crossing.

At the beginning of each scan-line, the lastX variable is initialised to zero at step 630. For each scan-line, at step 635, the next edge crossing is processed in a pre-determined order, such as from left to right. For each edge crossing, the edge processor 410 will compare the value of the lastX variable with the x coordinate of the current edge crossing 'edgeX' at step 640. If lastX is less than edgeX (yes), the edge processor 410 will send a SPAN command 605 to the multi-processor rendering engine 420 at step 645. The variable lastX holds the starting x coordinate of the current span. The length of the span is calculated by subtracting lastX from edgeX. Once the SPAN command 605 is sent, the lastX variable is updated by assigning the value of edgeX to lastX at step 650. For each edge crossing, the edge processor 410 updates the level table 450 at step 655. If lastX is not less than edgeX (no), at step 640, processing proceeds directly to step 655 for updating of the level table 450.

At step 660, a determination is made whether a fill was activated. If so (yes), the edge processor 410 sends an ADD command 610 containing the ID of the activated fill and the index of the level table entry to the multi-processor rendering engine 420 at step 665. Thereafter, processing proceeds to step 635 for retrieval of the next edge crossing.

If a fill was not activated (no), at step 660, a determination is made whether the edge crossing caused a fill to be deactivated at step 670. If so (yes), the edge processor 410 sends a REMOVE command 615 at step 675. Thereafter, processing proceeds to step 635 for retrieval of the next edge crossing.

If a fill was not deactivated (no), at step 670, processing proceeds directly to step 635 for retrieval of the next edge crossing.

Anti-aliasing may be performed on each edge crossing. In such embodiments, a contribution value that denotes a percentage of the pixel which is activated and a coverage value that represents the area of the pixel covered by the fill may be required. These contribution and coverage values of contributing fills could be maintained in the level table. As the contribution and coverage values change along the scan-line, the edge processor 410 could send commands to the multi-processor rendering engine 420 to synchronise the information maintained in the composite stacks 460, 470.

Figure 7:
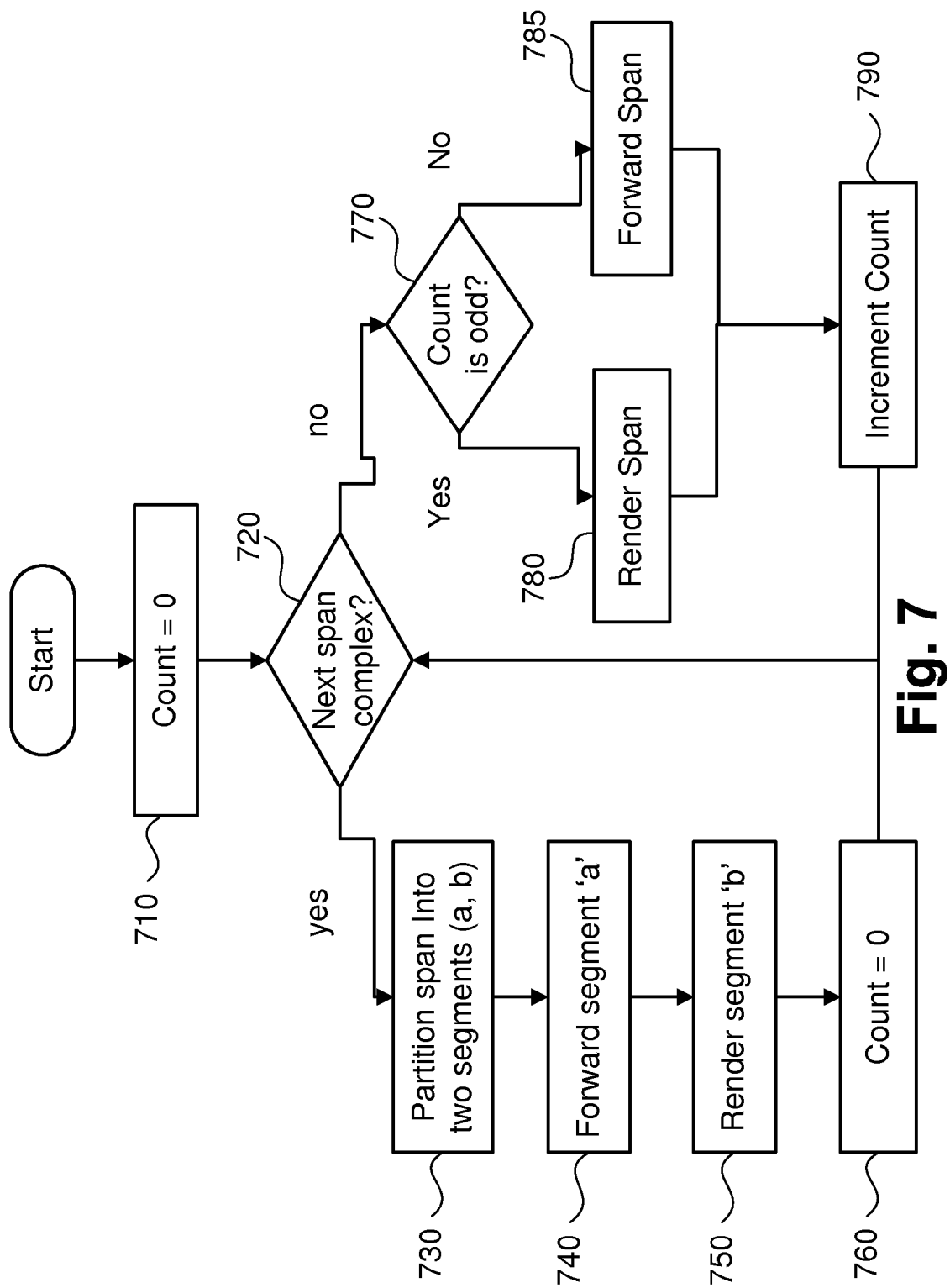
FIG. 7 is a flow diagram of operation of a rendering processor in a multi-processor rendering system in accordance with an embodiment of the present invention.

FIG. 7 is a flow diagram of a method for processing SPAN commands in accordance with an embodiment of the present invention. For example, the rendering processor core 475 of the embodiment described hereinbefore with reference to FIG. 4 may use the method or process of FIG. 7 to process each SPAN command 605. In this embodiment, most of the load balancing decisions are taken by the rendering processor core 475. Rendering processor core 485 simply processes all SPAN commands 605 that are received. In an alternate embodiment with a third rendering core, rendering processor core 485 could perform some further load balancing.

In the embodiment of FIG. 7, rendering processor core 475 functions entirely without the use of feedback 480 from rendering processor core 485. Rendering core 475 keeps track of a variable called 'Count', which is essentially a count of the number of simple spans which have been processed since a complex span was last processed.

Referring to FIG. 7, the 'Count' variable is initialized to a value of zero at the beginning of a scan-line at step 710. Rendering processor core 475 then inspects the next command from the incoming queue 402 and applies a test at step 720 to determine whether the next span to be rendered is complex.

If the span is classified as complex (yes), rendering processor core 475 determines the segments by partitioning the complex span into 'segment a' and 'segment b' at step 730. The 'segment a' has a lower start X coordinate than 'segment b'. Rendering processor core 475 packages 'segment a' up as a separate SPAN command, and forwards it at step 740 to rendering processor core 485 for rendering further down the pipeline. Rendering processor core 475 then renders 'segment b' at step 750 by referring to the fills present in its composite stack 460. Count is then reset to a value of zero at step 760 and processing returns to step 720 for the next span.

If the span is determined not to be complex (no), at step 720, the Count variable is checked at step 770. If Count is an even number (no), the SPAN command is forwarded to rendering processor core 485 for processing at step 785. If Count is an odd number (yes), rendering processor core 475 renders the span at step 780.

Following steps 780 and 785, the Count variable is incremented at step 790. Thereafter, rendering processor core 475 retrieves the next span from the queue 402. The process will then repeat, beginning with the determination of whether the next span is complex at step 720.

In certain embodiments that perform anti-aliasing, extra processing may be required when calculating the colour of pixels that contain edge crossings due to incorporating contribution value and coverage value of contributing fills. The workload of processing these single pixel spans may be distributed independently of the simple spans by using a separate count variable 'single-pixel-span-count'. The variable 'single-pixel-span-count' is a count of the number of single-pixel spans containing edge crossings processed since the last complex span for the current scan-line. When the variable 'single-pixel-span-count' is even, the next single pixel span comprising an edge crossing is allocated to rendering processor core 485. When the variable 'single-pixel-span-count' is odd, the next single pixel span comprising an edge crossing will be allocated to rendering processor core 475.

Figure 8:
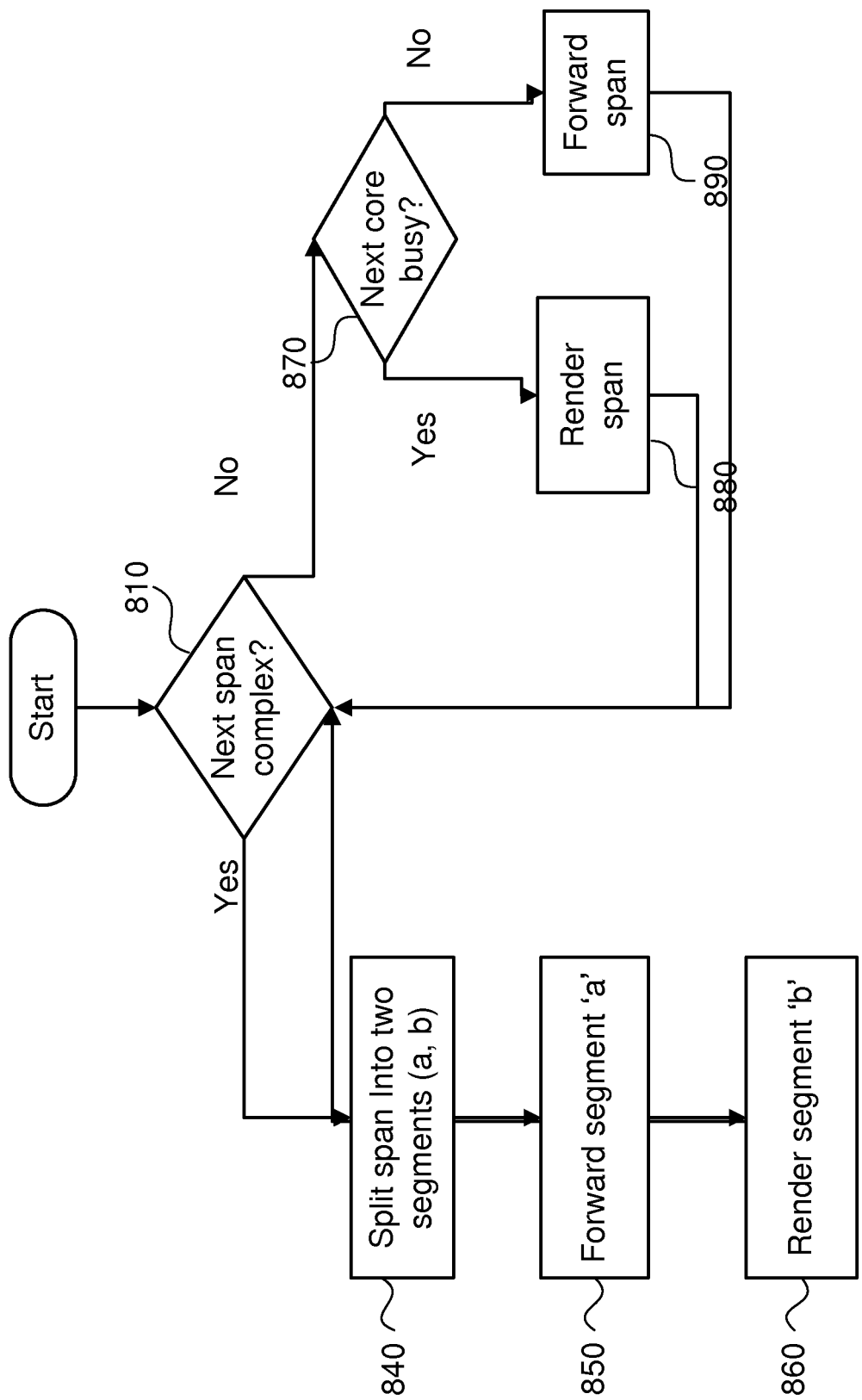
FIG. 8 is a flow diagram of operation of a rendering processor in a multi-processor rendering system in accordance with another embodiment of the present invention.

FIG. 8 is a flow diagram of a method for processing SPAN commands in accordance with another embodiment of the present invention. For example, the rendering processor core 475 of the embodiment described herein before with reference to FIG. 4 may use the method or process of FIG. 8 to process each SPAN command 605. Similarly to the embodiment of FIG. 7, rendering processor core 475 is responsible for distributing the workload among the rendering processor cores. Rendering processor core 485 processes all SPAN 605 commands which are allocated to it by rendering processor core 475. In the embodiment described herein with reference to FIG. 8, rendering processor core 475 may optionally use feedback data 480 from rendering processor core 485 when allocating work to rendering processor core 485. The feedback data 480 can be used to represent either a current or existing level of workload or a "busy/not busy" state of rendering processor core 485.

Referring to FIG. 8, rendering processor core 475 inspects the next SPAN command 605 from the incoming queue 402 and applies a test to determine whether the span is complex at step 810.

If a span is determined not to be complex (no), a determination is made at step 870 whether the next rendering processor core (i.e., rendering processor core 485) is busy by checking the feedback 480 from rendering processor core 485. If rendering processor core 485 is ready to accept work (no), the span command is forwarded to rendering processor core 485 for processing at step 890. If the rendering core (2) 485 is busy (yes), rendering processor core 75 renders the current span at step 880. Following steps 880 and 890, the method or process reverts to step 810 to determine whether the next span is complex or not.

If the span is a complex span (yes), at step 810, rendering processor core 475 determines the segments by partitioning or dividing the complex span into 'segment a' and 'segment b', at step 840. The 'segment a' has a lower start X coordinate than 'segment b'. Rendering processor core 475 then forwards 'segment a', packaged as a new SPAN command for rendering further down the pipeline, to rendering processor core 485 at step 850. Rendering processor core 475 then renders 'segment b' at step 860 by referring to the fills present in its composite stack 460. After rendering 'segment b', rendering processor core 475 retrieves the next span from the queue 402 and repeats the process, beginning with determination of whether the next span is complex at step 810.

In some embodiments, rendering processor core 475 may utilise the feedback 480 provided by the rendering core (2) 485 to dynamically partition or divide the complex spans into segments at step 840. The feedback 480 may be used to partition the span into segments such that a segment allocated to rendering processor core 485 requires less processing than a segment allocated to rendering processor core 475. This may be beneficial if rendering processor core 485 is busy processing previously allocated spans or segments.

Figure 9:
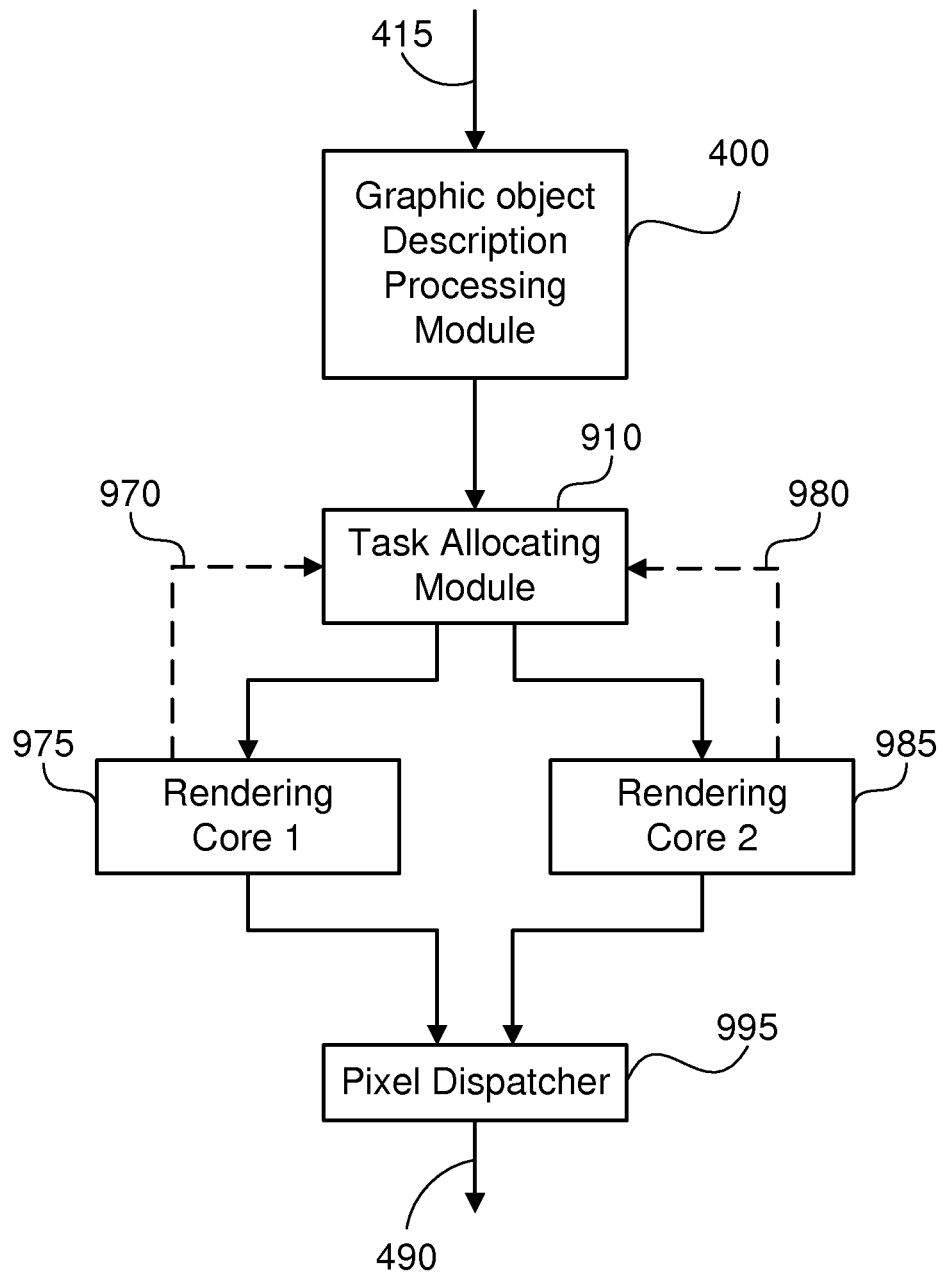
FIG. 9 is a schematic block diagram of a multi-processor rendering system in accordance with another embodiment of the present invention.

FIG. 9 is a schematic block diagram of a multi-processor rendering system in accordance with another embodiment of the present invention.

FIG. 9 is a schematic block diagram of a multi-processor rendering system in accordance with another embodiment of the present invention. The embodiment of FIG. 9 is similar to the embodiment of FIG. 4, however, the rendering processor cores 975 and 985 are arranged in a parallel configuration as opposed to a pipelined configuration.

Data flow commences with an input source containing graphical object descriptions 415, which are supplied to the graphical object description processing module 400. The graphical object description processing module 400 interprets the object descriptions to generate a display list. Once the display list has been generated, the graphical object description processing module 400 starts processing edge crossings for each scan-line to determine spans. Information about the determined spans is sent to the task allocating module 910.

In the embodiment of FIG. 9, load balancing takes place in the task allocating module 910. The task allocating module 910 may, for example, determine segments by partitioning or dividing complex spans. The segments are then allocated to the rendering processor cores 975 and 985. Simple spans may be distributed among the rendering cores 975 and 985 using a round robin allocation scheme or by checking optional feedback signals 970 and 980 provided by the rendering processor cores 975 and 985, respectively. However, certain embodiments of the present invention advantageously allocate spans and segment amongst rendering processor cores independently of such feedback.

The graphical object description processing module 400 and task allocating module 910 may be implemented using one or more processors or processor cores.

Rendering processor cores 975 and 985 process every span that is allocated to them by the task allocating module 910. The output streams of both rendering processor cores 975 and 985 comprising pixel data commands are sent to the pixel dispatcher 995. The pixel dispatcher 995 decodes pixel data commands and writes pixels 490 to the intended destination. In an alternate embodiment, rendering processor cores 975 and 985 may directly write pixels to a destination such as a frame buffer, thus eliminating the need for a pixel dispatcher 995.

The embodiments described hereinbefore are applicable to the computer and data processing industries and particularly for rendering of raster images on a display device such as a video display or a printer.

The foregoing describes only some embodiments of the present invention, and modifications and/or changes can be made thereto without departing from the scope and spirit of the invention, the embodiments being illustrative and not restrictive.

We claim:

1. A method for allocating a workload in a pixel sequential rendering system comprising a plurality of processors, said workload comprising a plurality of spans in each scanline of a raster pixel image comprising a plurality of graphical objects, said method comprising, for each scan line of said raster pixel image, the steps of:
   identifying, in a predetermined order, edges of said plurality of graphical objects that intersect with a current scan line of said raster pixel image;
   determining if a span of pixel locations on the current scan line defined by an adjacent pair of edges of the identified edges is complex based on whether pixels for the span have varying values;
   if the span is determined to be complex, dividing the span into a plurality of segments and allocating, independently of existing workloads of said plurality of processors, the plurality of segments among respective ones of the plurality of processors for rendering; and
   if the span is not determined to be complex, allocating the span into one of said plurality of processors without dividing the span for rendering, wherein spans which are not determined to be complex are allocated into one of said plurality of processors in a round robin manner.

2. The method of claim 1, wherein said span of pixel locations is intentionally divided into a plurality of segments such that each segment represents a substantially equal load.

3. The method of claim 1, wherein said span of pixel locations is intentionally divided into a plurality of segments such that said segments represent unequal loads.

4. The method of claim 1, wherein said span of pixel locations is divided into a plurality of segments based on one or more factors in the group of factors consisting of:
   capacity of said plurality of processors; and
   processing power of said plurality of processors.

5. The method of claim 1, wherein complexity of said span of pixel locations is determined based on changes in pixel values across said span of pixel locations.

6. A pixel sequential rendering system for rendering raster pixel images comprising a plurality of graphical objects, said system comprising: memory for storing data and program instructions; a plurality of rendering processors coupled to said memory; and a processor coupled to said memory and at least one of said plurality of rendering processors, said processor programmed to:
   identify edges of said plurality of graphical objects that intersect with a current scan line of said raster pixel image;
   determine if a span of pixel locations on the current scan line defined by an adjacent pair of edges of the identified edges is complex based on whether pixels for the span have varying values;
   divide, if the span is determined to be complex, the span into a plurality of segments and allocate, independently of existing workloads of said plurality of processors, the plurality of segments among respective ones of the plurality of processors for rendering; and allocate, if the span is not determined to be complex, the span into one of said plurality of processors without dividing the span for rendering, wherein spans which are not determined to be complex are allocated into one of said plurality of processors in a round robin manner.

7. The system of claim 6, wherein said span of pixel locations defined by an adjacent pair of edges is divided into a plurality of segments based on changes in pixel value across said span of pixel locations.

8. The system of claim 6, wherein said plurality of rendering processors are configured in a pipelined configuration.

9. The system of claim 6, wherein said plurality of processors are configured in a parallel configuration.

10. The system of claim 6, wherein complexity of said span of pixel locations is determined based on changes in pixel values across said span of pixel locations.

11. A non-transitory computer readable storage medium comprising a computer program recorded therein for allocating a workload in a pixel sequential rendering system comprising a plurality of processors, said workload comprising a plurality of spans in each scanline of a raster pixel image comprising a plurality of graphical objects, said computer program product comprising:

computer program code means for identifying, in a predetermined order, edges of the plurality of graphical objects that intersect with a current scan line of said raster pixel image;

computer program code means for determining if a span of pixel locations on the current scan line defined by the adjacent pair of edges of the identified edges is complex based on whether pixels for the span have varying values;

computer program code means for dividing, if the span is determined to be complex, the span into a plurality of segments and allocating, independently of existing workloads of said plurality of processors, the plurality of segments among respective ones of the plurality of processors for rendering; and computer program code means for allocating, if the span is not determined to be complex, the span into one of said plurality of processors without dividing the span for rendering, wherein spans which are not determined to be complex are allocated into one of said plurality of processors in a round robin manner.

12. The computer readable medium of claim 11, wherein complexity of said span of pixel locations is determined based on changes in pixel values across said span of pixel locations.

* * * * *